(12) United States Patent
Kawahara et al.

(10) Patent No.: US 12,384,912 B2
(45) Date of Patent: Aug. 12, 2025

(54) THERMOPLASTIC ELASTOMER COMPOSITION, FORMED PRODUCT, LAYERED STRUCTURE, AND METHOD FOR PRODUCING THE LAYERED STRUCTURE

(71) Applicant: KURARAY CO., LTD., Kurashiki (JP)

(72) Inventors: Moe Kawahara, Tsukuba (JP); Shutaro Hirakata, Chiyoda-ku (JP); Tomohiro Ono, Tsukuba (JP)

(73) Assignee: KURARAY CO., LTD., Kurashiki (JP)

( * ) Notice: Subject to any disclaimer, the term of this patent is extended or adjusted under 35 U.S.C. 154(b) by 540 days.

(21) Appl. No.: 17/905,395

(22) PCT Filed: Feb. 26, 2021

(86) PCT No.: PCT/JP2021/007551
§ 371 (c)(1),
(2) Date: Aug. 31, 2022

(87) PCT Pub. No.: WO2021/177194
PCT Pub. Date: Sep. 10, 2021

(65) Prior Publication Data
US 2023/0138239 A1    May 4, 2023

(30) Foreign Application Priority Data
Mar. 3, 2020  (JP) .................. 2020-035807

(51) Int. Cl.
C08L 53/02     (2006.01)
C08F 220/14    (2006.01)
C08F 220/18    (2006.01)
C08L 25/16     (2006.01)

(52) U.S. Cl.
CPC .......... *C08L 53/025* (2013.01); *C08F 220/14* (2013.01); *C08F 220/1804* (2020.02); *C08F 220/1808* (2020.02); *C08L 25/16* (2013.01); C08L 2205/03 (2013.01); C08L 2207/04 (2013.01)

(58) Field of Classification Search
None
See application file for complete search history.

(56) References Cited

U.S. PATENT DOCUMENTS

| | | |
|---|---|---|
| 7,772,319 B2 | 8/2010 | Fujihara et al. |
| 8,658,727 B2 | 2/2014 | Date |
| 10,350,864 B2 | 7/2019 | Oshima et al. |
| 2009/0105396 A1 | 4/2009 | Fujihara et al. |
| 2013/0231433 A1 | 9/2013 | Date |
| 2016/0243799 A1* | 8/2016 | Oshima .................. B32B 27/08 |

FOREIGN PATENT DOCUMENTS

| | | |
|---|---|---|
| EP | 0 238 135 A2 | 9/1987 |
| EP | 0 238 135 B1 | 12/1992 |
| EP | 1 498 455 A1 | 1/2005 |
| EP | 0 863 184 B1 | 6/2005 |
| EP | 2 942 370 A1 | 11/2015 |
| JP | 62-227987 A | 10/1987 |
| JP | 2003-277575 A | 10/2003 |
| JP | 2004-307585 A | 11/2004 |
| JP | 2009-249417 A | 10/2009 |
| JP | 2019-157067 A | 9/2019 |
| JP | 2019-178239 A | 10/2019 |
| WO | WO 2007/023932 A1 | 3/2007 |
| WO | WO 2011/135927 A1 | 11/2011 |
| WO | WO 2015/046251 A1 | 4/2015 |

OTHER PUBLICATIONS

Extended European Search Report issued Feb. 26, 2024, in corresponding European patent application No. 21763900.4, 6 pages.
International Search Report and Written Opinion issued Apr. 20, 2021 in PCT/JP2021/007551 (with English translation of Search Report). 10 pages.
International Preliminary Report and Written Opinion issued Sep. 6, 2022 in PCT/JP2021/007551 (submitting English translation only), 5 pages.

* cited by examiner

*Primary Examiner* — Christopher M Rodd
(74) *Attorney, Agent, or Firm* — Oblon, McClelland, Maier & Neustadt, L.L.P.

(57) ABSTRACT

A thermoplastic elastomer composition including 100 parts by mass of a hydrogenated block copolymer (A), 20 to 180 parts by mass of an acrylic block copolymer (B), 5 to 45 parts by mass of an aromatic polymer (C), and 70 to 250 parts by mass of a softener (D). The hydrogenated block copolymer (A) is a hydrogenated product of a block copolymer (P) having at least two polymer blocks (a1) with a structural unit derived from an aromatic vinyl compound and at least one polymer block (a2) with a structural unit derived from a conjugated diene. The acrylic block copolymer (B) has at least one polymer block (b1) with a structural unit derived from an acrylate and at least one polymer block (b2) with a structural unit derived from a methacrylate.

9 Claims, No Drawings

THERMOPLASTIC ELASTOMER COMPOSITION, FORMED PRODUCT, LAYERED STRUCTURE, AND METHOD FOR PRODUCING THE LAYERED STRUCTURE

CROSS REFERENCE TO RELATED APPLICATIONS

This application is a National Stage entry under 35 U.S.C. § 371 of PCT/JP2021/007551, filed on Feb. 26, 2021, and claims priority to Japanese Patent Application No. 2020-035807, filed on Mar. 3, 2020. The entire contents of both are incorporated herein by reference.

TECHNICAL FIELD

The present invention relates to a thermoplastic elastomer composition, a formed product, a layered structure, and a method for producing the layered structure.

BACKGROUND ART

Due to their high formability, thermoplastic elastomer compositions, including styrene thermoplastic elastomers, have been used as formed products produced by hot melt forming, such as injection or extrusion forming, for various components, such as household electrical appliances, electronic components, automotive parts, and mechanical parts. The term "styrene thermoplastic elastomer", as used herein, refers to a block copolymer having a polymer block with a structural unit derived from an aromatic vinyl compound and a polymer block with a structural unit derived from a conjugated diene. To improve physical properties of these components, a component composed of different materials bonded or combined together is sometimes used and is required to be produced as a desired formed product by overmolding, two-color molding or coextrusion, for example.

However, styrene thermoplastic elastomers are low-polarity materials and have the problem of insufficient adhesive strength to polar materials, for example, polar resins, ceramics, and metals.

A composition proposed as a means for solving this problem is a styrene thermoplastic elastomer to which a polar soft polymer, for example, an acrylic block copolymer having a polymer block with a structural unit derived from an acrylate and a polymer block with a structural unit derived from a methacrylate is added (see Patent Literature 1, for example).

CITATION LIST

Patent Literature

PTL 1: JPA 2019-157067

SUMMARY OF INVENTION

Technical Problem

A composition disclosed in Patent Literature 1 is a good composition in terms of high adhesiveness to polar materials. However, there was room for improvement in the transparency of the composition.

The present invention has been made in view of the above situations and aims to provide a thermoplastic elastomer composition with high flexibility, tensile properties, and transparency, and with high adhesive strength even to polar materials, a formed product, a layered structure, and a method for producing the layered structure.

Solution to Problem

The gist of the present invention includes the following [1] to [9].

[1] A thermoplastic elastomer composition containing: 100 parts by mass of a hydrogenated block copolymer (A); 20 to 180 parts by mass of an acrylic block copolymer (B); 5 to 45 parts by mass of an aromatic polymer (C); and 70 to 250 parts by mass of a softener (D),
wherein the hydrogenated block copolymer (A) is a hydrogenated product of a block copolymer (P) having at least two polymer blocks (a1) with a structural unit derived from an aromatic vinyl compound and at least one polymer block (a2) with a structural unit derived from a conjugated diene, a polymer block (a1) content ranging from 3% to 45% by mass,
the acrylic block copolymer (B) has at least one polymer block (b1) with a structural unit derived from an acrylate and at least one polymer block (b2) with a structural unit derived from a methacrylate, and
the acrylic block copolymer (B) has a peak top molecular weight in the range of 50,000 to 180,000.

[2] The thermoplastic elastomer composition according to [1], wherein the hydrogenated block copolymer (A) has a peak top molecular weight in the range of 20,000 to 500,000.

[3] The thermoplastic elastomer composition according to [1] or [2], wherein the aromatic polymer (C) is a polymer of a monomer including at least one selected from the group consisting of styrene, alpha-methylstyrene, and 4-methylstyrene.

[4] The thermoplastic elastomer composition according to any one of [1] to [3], wherein the acrylic block copolymer (B) has a molecular weight distribution in the range of 1.0 to 1.4.

[5] The thermoplastic elastomer composition according to any one of [1] to [4], wherein the acrylic block copolymer (B) is a triblock copolymer having a polymer block (b2) at each end of the polymer block (b1).

[6] The thermoplastic elastomer composition according to any one of [1] to [5], wherein a polymer block (b2) content of the acrylic block copolymer (B) ranges from 10% to 55% by mass.

[7] A formed product formed of the thermoplastic elastomer composition according to any one of [1] to [6].

[8] A layered structure including: a layer formed of the thermoplastic elastomer composition according to any one of [1] to [6]; and a layer formed of a material other than the thermoplastic elastomer composition.

[9] A method for producing a layered structure, including melting, laminating, and forming the thermoplastic elastomer composition according to any one of [1] to [6] and a structure composed of a material other than the thermoplastic elastomer composition.

Advantageous Effects of Invention

The present invention can provide a thermoplastic elastomer composition with high flexibility, tensile properties, and transparency, and with high adhesive strength even to polar materials, a formed product, a layered structure, and a method for producing the layered structure.

DESCRIPTION OF EMBODIMENTS

The term "(meth)acrylate", as used herein, refers to "methacrylate" or "acrylate". The term "(meth)acryl", as used herein, refers to "methacryl" or "acryl". The term "(meth)acryloyl", as used herein, refers to "acryloyl" or "methacryloyl".

[Thermoplastic Elastomer Composition]

A thermoplastic elastomer composition according to the present invention contains: 100 parts by mass of a hydrogenated block copolymer (A); 20 to 180 parts by mass of an acrylic block copolymer (B); 5 to 45 parts by mass of an aromatic polymer (C); and 70 to 250 parts by mass of a softener (D), wherein the hydrogenated block copolymer (A) is a hydrogenated product of a block copolymer (P) having at least two polymer blocks (a1) with a structural unit derived from an aromatic vinyl compound and at least one polymer block (a2) with a structural unit derived from a conjugated diene, a polymer block (a1) content ranging from 3% to 45% by mass, the acrylic block copolymer (B) has at least one polymer block (b1) with a structural unit derived from an acrylate and at least one polymer block (b2) with a structural unit derived from a methacrylate, and the acrylic block copolymer (B) has a peak top molecular weight in the range of 50,000 to 180,000.

<Hydrogenated Block Copolymer (A)>

The hydrogenated block copolymer (A) (hereinafter also referred to simply as a "hydrogenated block copolymer (A)") is a hydrogenated product of a block copolymer (P) having at least two polymer blocks (a1) with a structural unit derived from an aromatic vinyl compound and at least one polymer block (a2) with a structural unit derived from a conjugated diene, the polymer block (a1) content ranging from 3% to 45% by mass.

[Polymer Block (a1)]

The polymer block (a1) has a structural unit derived from an aromatic vinyl compound. Examples of the aromatic vinyl compound include styrene, alpha-methylstyrene, 2-methylstyrene, 3-methylstyrene, 4-methylstyrene, 4-propylstyrene, 4-t-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenylbutyl) styrene, 1-vinylnaphthalene, 2-vinylnaphthalene, vinylanthracene, N,N-diethyl-4-aminoethylstyrene, vinylpyridine, 4-methoxystyrene, monochlorostyrene, dichlorostyrene, and divinylbenzene. These aromatic vinyl compounds may be used alone or in combination. Among these, styrene, alpha-methylstyrene, and 4-methylstyrene are preferred, and styrene is more preferred.

The polymer block (a1) may have a structural unit derived from a monomer other than the aromatic vinyl compounds, for example, another monomer such as a monomer constituting the polymer block (a2) described later. The amount of the structural unit derived from an aromatic vinyl compound in the polymer block (a1) is preferably 60% or more by mass, more preferably 70% or more by mass, still more preferably 80% or more by mass, still more preferably 90% or more by mass, particularly preferably 100% by mass.

[Polymer Block (a2)]

The polymer block (a2) has a structural unit derived from a conjugated diene. Examples of the conjugated diene include butadiene, isoprene, 2,3-dimethyl-butadiene, 2-phenyl-butadiene, 1,3-pentadiene, 2-methyl-1,3-pentadiene, 1,3-hexadiene, 1,3-octadiene, 1,3-cyclohexadiene, 2-methyl-1,3-octadiene, 1,3,7-octatriene, myrcene, farnesene, and chloroprene. These conjugated dienes may be used alone or in combination. Among these, butadiene, isoprene, and farnesene are preferred.

The farnesene may be alpha-farnesene or beta-farnesene represented by the following formula (1), and beta-farnesene is preferred in terms of the ease of production of the block copolymer (P). Alpha-farnesene and beta-farnesene may be used in combination.

[Chem. 1]

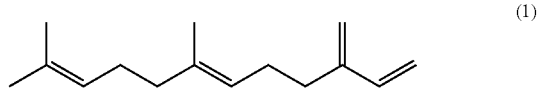

(1)

The polymer block (a2) may have a structural unit derived from a monomer other than the conjugated dienes, for example, another monomer such as a monomer constituting the polymer block (a1). The amount of the structural unit derived from a conjugated diene in the polymer block (a2) is preferably 60% or more by mass, more preferably 70% or more by mass, still more preferably 80% or more by mass, still more preferably 90% or more by mass, particularly preferably 100% by mass.

The hydrogenated block copolymer (A) is a hydrogenated product of a block copolymer (P) having at least two polymer blocks (a1) and at least one polymer block (a2).

The polymer block (a1) and the polymer block (a2) may be bonded together in any manner, for example, in a linear, branched, or radial manner, or in a combined manner of two or more thereof. In particular, each block is preferably bonded together in a linear manner, and a preferred bonding form is represented by (a1-a2)$_l$, a1-(a2-a1)$_m$, or a1-(a1-a2)$_n$, wherein a1 denotes the polymer block (a1), and a2 denotes the polymer block (a2). In the formulae, l and n independently denote an integer of 2 or more, and m denotes an integer of 1 or more.

In terms of flexibility, molding processability, and handleability, the bonding form is preferably composed of the polymer block (a1), the polymer block (a2), and the polymer block (a1) bonded in this order (the polymer block (a1) is bonded to each end of the polymer block (a2)), and the hydrogenated block copolymer (A) is preferably a hydrogenated product of the triblock copolymer represented by a1-a2-a1.

The two or more polymer blocks (a1) may be polymer blocks composed of the same structural unit or polymer blocks composed of different structural units. Likewise, each of the two or more polymer blocks (a2) may be a polymer block composed of the same structural unit or a polymer block composed of different structural units. For example, in the two polymer blocks (a1) of the triblock copolymer represented by a1-a2-a1, each aromatic vinyl compound may be of the same or different type.

The polymer block (a1) content of the block copolymer (P) ranges from 3% to 45% by mass. A thermoplastic elastomer composition with high flexibility and molding processability can be produced in this range. From this perspective, the polymer block (a1) content preferably ranges from 5% to 42% by mass, more preferably 10% to 40% by mass, still more preferably 12% to 37% by mass, still more preferably 15% to 35% by mass.

The polymer block (a2) content of the block copolymer (P) typically ranges from 55% to 97% by mass, preferably 58% to 95% by mass, more preferably 60% to 90% by mass, still more preferably 63% to 88% by mass, still more preferably 65% to 85% by mass.

In the present specification, when the same polymer blocks are linearly bonded, for example, via a divalent coupling agent, the entire bonded polymer block is considered to be one polymer block. Thus, a polymer block that should be strictly represented by a1-X-a1 (X denotes a coupling agent residue) is represented by a1 as a whole. In the present specification, this type of polymer block containing the coupling agent residue is considered as described above. For example, a block copolymer that contains the coupling agent residue and should be strictly represented as a1-a2-X-a2-a1 is represented by a1-a2-a1 and is considered to be an example of a triblock copolymer.

The total amount of the polymer block (a1) and the polymer block (a2) in the block copolymer (P) is preferably 80% or more by mass, more preferably 90% or more by mass, still more preferably 95% or more by mass, still more preferably 100% by mass.

The hydrogenated block copolymer (A) is a hydrogenated product of the block copolymer (P). In terms of heat resistance and weatherability, the hydrogenation rate of the carbon-carbon double bond in the polymer block (a2) preferably ranges from 50% to 100% by mole, more preferably 70% to 100% by mole, still more preferably 75% to 100% by mole, still more preferably 80% to 100% by mole, particularly preferably 85% to 100% by mole, more particularly preferably 90% to 100% by mole.

The hydrogenation rate can be calculated by measuring $^1$H-NMR of the block copolymer (P) and the hydrogenated block copolymer (A) after hydrogenation.

In terms of molding processability, the hydrogenated block copolymer (A) preferably has a peak top molecular weight (Mp) of 20,000 or more, more preferably 30,000 or more, still more preferably 40,000 or more, still more preferably 50,000 or more, particularly preferably 60,000 or more, more particularly preferably 70,000 or more, more particularly preferably 75,000 or more, and preferably 500,000 or less, more preferably 300,000 or less, still more preferably 200,000 or less, still more preferably 150,000 or less, particularly preferably 140,000 or less, more particularly preferably 130,000 or less, more particularly preferably 125,000 or less.

The hydrogenated block copolymer (A) preferably has a molecular weight distribution (Mw/Mn) in the range of 1 to 6, more preferably 1 to 4, still more preferably 1 to 3, still more preferably 1 to 2. A molecular weight distribution in these ranges results in small variations in viscosity and easy handling of the hydrogenated block copolymer (A).

The peak top molecular weight (Mp), the weight-average molecular weight (Mw), and the number-average molecular weight (Mn) of the hydrogenated block copolymer (A) are values determined by gel permeation chromatography based on polystyrene standards, and the molecular weight distribution (Mw/Mn) is a value calculated from Mw and Mn.

In addition to the polymer block (a1) and the polymer block (a2), the block copolymer (P) may have a polymer block composed of another monomer without losing the advantages of the present invention.

Examples of the other monomer include unsaturated hydrocarbon compounds, such as propylene, 1-butene, 1-pentene, 4-methyl-1-pentene, 1-hexene, 1-octene, 1-decene, 1-undecene, 1-dodecene, 1-tridecene, 1-tetradecene, 1-pentadecene, 1-hexadecene, 1-heptadecene, 1-octadecene, 1-nonadecene, and 1-eicosene; and unsaturated compounds with a functional group, such as acrylic acid, methacrylic acid, methyl acrylate, methyl methacrylate, acrylonitrile, methacrylonitrile, maleic acid, fumaric acid, crotonic acid, itaconic acid, 2-acryloylethanesulfonic acid, 2-methacryloylethanesulfonic acid, 2-acrylamide-2-methylpropanesulfonic acid, 2-methacrylamide-2-methylpropanesulfonic acid, vinylsulfonic acid, vinyl acetate, and methyl vinyl ether. These may be used alone or in combination.

When the block copolymer (P) has another polymer block, the amount of the other polymer block is preferably 20% or less by mass, more preferably 10% or less by mass, still more preferably 5% by mass.

[Method for Producing Hydrogenated Block Copolymer (A)]

The hydrogenated block copolymer (A) can be suitably produced, for example, by a polymerization step of producing the block copolymer (P) by anionic polymerization and the step of hydrogenating a carbon-carbon double bond in the polymer block (a2) in the block copolymer (P).

(Polymerization Step)

The block copolymer (P) can be produced by a solution polymerization method or a method disclosed in Japanese Unexamined Patent Application Publication (Translation of PCT Application) No. 2012-502135 or No. 2012-502136. Among these, the solution polymerization method is preferred, and a known method, for example, an ionic polymerization method, such as anionic polymerization or cationic polymerization, or a radical polymerization method may be used. Among these, the anionic polymerization method is preferred. The anionic polymerization method is preferably a method of producing the block copolymer (P) by successively adding monomers, such as an aromatic vinyl compound and a conjugated diene, in a solvent exemplified by a hydrocarbon, if necessary, in the presence of an ether compound or a Lewis base exemplified by a tertiary amine, using an anionic polymerization initiator exemplified by an organic alkali metal.

The polymerization reaction can be stopped by adding an alcohol, such as methanol or isopropanol, as a polymerization terminator. The block copolymer (P) can be isolated by pouring the polymerization reaction liquid into a poor solvent, such as methanol, to precipitate the block copolymer (P) or by washing the polymerization reaction liquid with water followed by separation and drying.

The block copolymer (P) may be produced by a method of polymerizing the polymer block (a1) and the polymer block (a2) in this order and coupling the ends of the polymer block (a2) using a coupling agent exemplified by a halogenated silane compound.

The block copolymer (P) may be modified before the hydrogenation step described later. Examples of a functional group that can be introduced include an amino group, an alkoxysilyl group, a hydroxy group, an epoxy group, a carboxy group, a carbonyl group, a mercapto group, an isocyanate group, and an acid anhydride group.

The block copolymer may be modified by a method of adding a coupling agent exemplified by tin tetrachloride capable of reacting with a polymerization active end, a polymerization end modifying agent exemplified by 4,4'-bis(diethylamino)benzophenone, or another modifying agent described in JPA 2011-132298, before the addition of a polymerization terminator. A method of grafting maleic anhydride to an isolated copolymer can also be used.

(Hydrogenation Step)

The block copolymer (P) or the modified block copolymer (P) produced by the above method can be subjected to the hydrogenation step to produce the hydrogenated block copolymer (A). The hydrogenation method may be a known method. For example, a Ziegler catalyst or a hydrogenation catalyst exemplified by palladium carbon may be added to a solution of the block copolymer (P) dissolved in a solvent that does not affect the hydrogenation reaction, and then the hydrogenation reaction may be performed at an appropriate hydrogen pressure and at an appropriate reaction temperature.

<Acrylic Block Copolymer (B)>

The acrylic block copolymer (B) has at least one polymer block (b1) with a structural unit derived from an acrylate and at least one polymer block (b2) with a structural unit derived from a methacrylate. A thermoplastic elastomer composition containing the acrylic block copolymer (B) has high flexibility and adhesive strength.

[Polymer Block (b1)]

The polymer block (b1) has a structural unit derived from an acrylate. The acrylate is broadly classified into an acrylate represented by the general formula $CH_2=CH-COOR^1$ (X) (in the formula (X), $R^1$ denotes an organic group having 4 to 6 carbon atoms) (hereinafter referred to as an acrylate (b1-1)), an acrylate represented by the general formula $CH_2=CH-COOR^2$ (Y) (in the formula (Y), $R^2$ denotes an organic group having 7 to 12 carbon atoms) (hereinafter referred to as an acrylate (b1-2)), and another acrylate.

Examples of the organic group having 4 to 6 carbon atoms represented by $R^1$ include alkyl groups having 4 to 6 carbon atoms, such as a butyl group, an amyl group (pentyl group), a hexyl group, and a cyclohexyl group; aromatic ring groups having 6 carbon atoms, such as a phenyl group; and organic groups containing an element other than carbon, such as oxygen, and having 4 to 6 carbon atoms in total, such as an ethoxyethyl group, a tetrahydrofurfuryl group, and a diethylaminoethyl group. Examples of the acrylate (b1-1) include acrylates without a functional group, such as n-butyl acrylate, isobutyl acrylate, sec-butyl acrylate, tert-butyl acrylate, amyl acrylate, isoamyl acrylate, n-hexyl acrylate, cyclohexyl acrylate, and phenyl acrylate; and acrylates with a functional group, such as ethoxyethyl acrylate, tetrahydrofurfuryl acrylate, and diethylaminoethyl acrylate.

Examples of the organic group having 7 to 12 carbon atoms represented by $R^2$ include alkyl groups having 7 to 12 carbon atoms, such as an ethylhexyl group, an octyl group, a decyl group, an isobornyl group, and a lauryl group; aromatic ring groups having 7 to 12 carbon atoms, such as a benzyl group, and organic groups containing an element other than carbon, such as oxygen, and having 7 to 12 carbon atoms in total, such as a phenoxyethyl group. Examples of the acrylate (b1-2) include acrylates without a functional group, such as 2-ethylhexyl acrylate, n-octyl acrylate, isooctyl acrylate, decyl acrylate, isobornyl acrylate, lauryl acrylate, and benzyl acrylate; and acrylates with a functional group, such as phenoxyethyl acrylate.

Examples of the acrylate other than the acrylate (b1-1) and the acrylate (b1-2) include acrylates without a functional group, such as methyl acrylate, ethyl acrylate, isopropyl acrylate, n-propyl acrylate, and octadecyl acrylate; and acrylates with a functional group, such as methoxyethyl acrylate, 2-hydroxyethyl acrylate, 2-aminoethyl acrylate, and glycidyl acrylate.

Among the acrylates (b1-1), in terms of the flexibility of the resulting thermoplastic elastomer composition, acrylates without a functional group are preferred, and n-butyl acrylate is more preferred.

Among the acrylates (b1-2), acrylates without a functional group are preferred, and 2-ethylhexyl acrylate, n-octyl acrylate, isooctyl acrylate, and benzyl acrylate are more preferable, in terms of clearer phase separation between the polymer block (b1) and the polymer block (b2) and high cohesive force of the resulting thermoplastic elastomer composition. Furthermore, 2-ethylhexyl acrylate is more preferred in terms of stable durability of the resulting thermoplastic elastomer composition over a wide temperature range.

The acrylates may be used alone or in combination. The amount of the structural unit derived from an acrylate in the polymer block (b1) is preferably 60% or more by mass, more preferably 80% or more by mass, still more preferably 90% or more by mass, and preferably 100% by mass in one embodiment.

Among the acrylates, at least one selected from the acrylate (b1-1) and the acrylate (b1-2) is preferred in terms of moderate adhesiveness that enables reseparation at normal temperature. In a preferred embodiment, the acrylate is the acrylate (b1-1).

In a preferred embodiment, the acrylate serving as a structural unit derived from an acrylate contained in the polymer block (b1) includes at least one selected from the acrylates (b1-1) and at least one selected from the acrylates (b1-2). In this case, the mass ratio (b1-1)/(b1-2) of a structural unit derived from the acrylate (b1-1) to a structural unit derived from the acrylate (b1-2) preferably ranges from 90/10 to 10/90, more preferably 60/40 to 40/60.

A (b1-1)/(b1-2) in these ranges results in increased compatibility between the acrylic block copolymer (B) and the hydrogenated block copolymer (A) and stable adhesiveness and formability. The mass ratio of the acrylate (b1-1) to the acrylate (b1-2) can be determined by $^1$H-NMR measurement.

A combination of the acrylate (b1-1) and the acrylate (b1-2) used in the polymer block (b1) may be n-butyl acrylate/2-ethylhexyl acrylate. In such a case, the acrylate (b1-1) and the acrylate (b1-2) to be used preferably have a solubility parameter difference in the range of 0.3 to 2.5 $(MPa)^{1/2}$. The solubility parameter can be calculated by a method described in "POLYMER HANDBOOK Forth Edition", VII pp. 675 to 714 (Wiley Interscience, 1999) and "Polymer Engineering and Science", 1974, vol. 14, pp. 147 to 154. When the acrylic block copolymer (B) contains two or more polymer blocks (b1), acrylates to be combined as the polymer blocks (b1) may be the same or different.

When the polymer block (b1) is a copolymer containing both an acrylate (b1-1) unit and an acrylate (b1-2) unit, the polymer block (b1) may be composed of a random copolymer, a block copolymer, or a gradient copolymer of the acrylate (b1-1) and the acrylate (b1-2) and is typically preferably composed of a random copolymer. When the acrylic block copolymer (B) contains two or more polymer blocks (b1), the polymer blocks (b1) may have the same or different structures. The total unit of the acrylates (b1-1) and (b1-2) in the polymer block (b1) preferably constitutes 60% or more by mass, more preferably 80% or more by mass, still more preferably 90% or more by mass, and in one embodiment preferably 100% by mass, of the polymer block (b1).

The polymer block (b1) preferably has a glass transition temperature in the range of −100 to 30 degrees Celsius, more preferably −80 to 10 degrees Celsius, still more preferably −70 to 0 degrees Celsius, particularly preferably −60 to −10 degrees Celsius. A glass transition temperature in these ranges results in a thermoplastic elastomer composition according to the present invention with high adhesiveness at normal temperature.

[Polymer Block (b2)]

The polymer block (b2) has a structural unit derived from a methacrylate. Examples of the methacrylate include methacrylates without a functional group, such as methyl methacrylate, ethyl methacrylate, isopropyl methacrylate, n-propyl methacrylate, n-butyl methacrylate, isobutyl methacrylate, sec-butyl methacrylate, tert-butyl methacrylate, n-hexyl methacrylate, cyclohexyl methacrylate, 2-ethylhexyl methacrylate, n-octyl methacrylate, lauryl methacrylate, tridecyl methacrylate, stearyl methacrylate, isobornyl methacrylate, phenyl methacrylate, and benzyl methacrylate; and methacrylates with a functional group, such as methoxyethyl methacrylate, ethoxyethyl methacrylate, diethylaminoethyl methacrylate, 2-hydroxyethyl methacrylate, 2-aminoethyl methacrylate, glycidyl methacrylate, and tetrahydrofurfuryl methacrylate.

Among these, to improve the heat resistance and durability of the resulting thermoplastic elastomer composition, preferred are methacrylates without a functional group, more preferred are methyl methacrylate, ethyl methacrylate, tert-butyl methacrylate, cyclohexyl methacrylate, 2-ethylhexyl methacrylate, isobornyl methacrylate, phenyl methacrylate, and benzyl methacrylate, and methyl methacrylate is still more preferred in terms of clearer phase separation between the polymer block (b1) and the polymer block (b2) and good mechanical properties of a thermoplastic elastomer composition. The polymer block (b2) may be composed of one or two or more of these methacrylates. The acrylic block copolymer (B) preferably has two or more polymer blocks (b2) in terms of improved adhesive durability. In this case, the polymer blocks (b2) may be the same or different.

The polymer block (b2) may have any peak top molecular weight (Mp), preferably in the range of 1,000 to 50,000, more preferably 2,000 to 30,000. A polymer block (b2) with Mp lower than these ranges may result in an acrylic block copolymer (B) with insufficient cohesive force. A polymer block (b2) with Mp higher than these ranges may result in an acrylic block copolymer (B) with high melt viscosity and a thermoplastic elastomer composition with low productivity. The amount of the structural unit derived from a methacrylate in the polymer block (b2) is preferably 60% or more by mass, more preferably 80% or more by mass, still more preferably 90% or more by mass, and preferably 100% by mass in one embodiment.

The polymer block (b2) preferably has a glass transition temperature in the range of 80 to 140 degrees Celsius, more preferably 90 to 130 degrees Celsius, still more preferably 100 to 120 degrees Celsius. When the glass transition temperature is in these ranges, the polymer block (b2) acts as a physical pseudo-crosslinking site and provides high adhesiveness, durability, and heat resistance at a typical operating temperature of the thermoplastic elastomer composition.

The polymer block (b1) may have a structural unit derived from a methacrylate without losing the advantages of the present invention, and the polymer block (b2) may have a structural unit derived from an acrylate without losing the advantages of the present invention. If necessary, the polymer block (b1) may have a structural unit derived from a monomer other than (meth)acrylates. Examples of the other monomer include vinyl monomers with a carboxy group, such as (meth)acrylic acid, crotonic acid, maleic acid, and fumaric acid; aromatic vinyl monomers, such as styrene, alpha-methylstyrene, p-methylstyrene, and m-methylstyrene; conjugated diene monomers, such as butadiene and isoprene; olefin monomers, such as ethylene, propylene, isobutene, and octene; lactone monomers, such as epsilon-caprolactone and valerolactone; and (meth)acrylamide, (meth)acrylonitrile, maleic anhydride, vinyl acetate, vinyl chloride, and vinylidene chloride. These monomers may preferably be used in an amount of 40% or less by mass, more preferably 20% or less by mass, still more preferably 10% or less by mass, of the total mass of the monomers of each polymer block.

The acrylic block copolymer (B) in the present invention may have another polymer block as required in addition to the polymer block (b1) and the polymer block (b2). Examples of the other polymer block include polymer or copolymer blocks with a structural unit derived from a monomer, such as styrene, alpha-methylstyrene, p-methylstyrene, m-methylstyrene, acrylonitrile, methacrylonitrile, ethylene, propylene, isobutene, butadiene, isoprene, octene, vinyl acetate, maleic anhydride, vinyl chloride, or vinylidene chloride; and polymer blocks composed of poly(ethylene terephthalate), poly(lactic acid), polyurethane, or polydimethylsiloxane. The polymer block also includes a hydrogenated product of a polymer block with a structural unit derived from a conjugated diene compound, such as butadiene or isoprene.

The acrylic block copolymer (B) is preferably represented by the following general formulae, wherein b1 denotes the polymer block (b1), b1' denotes a polymer block (b1) with a structure different from the polymer block (b1), and b2 denotes the polymer block (b2).

$(b2\text{-}b1)_n$
$(b2\text{-}b1)_n\text{-}b2$
$b1\text{-}(b2\text{-}b1)_n$
$(b2\text{-}b1)_n\text{-}b1'$
$(b2\text{-}b1)_n\text{-}Z$
$(b1\text{-}b2)_n\text{-}Z$ (In the formulae, n denotes an integer in the range of 1 to 30, and Z denotes a coupling site (a coupling site after a coupling agent reacts with a polymer end and forms a chemical bond, and – denotes a bonding arm of each polymer block). When the formulae include a plurality of b1s and b2s, they may be polymer blocks with the same structure or polymer blocks with different structures). The term "different structure", as used herein, refers to a structure that is different in at least one of a monomer unit constituting the polymer block, molecular weight, molecular weight distribution, stereoregularity, and in the presence of a plurality of monomer units the ratio of the monomer units and the type of copolymerization (random, gradient, or block). The n preferably ranges from 1 to 15, more preferably 1 to 8, still more preferably 1 to 4. Among these structures, in terms of high durability of a thermoplastic elastomer composition, preferred are linear block copolymers represented by $(b2\text{-}b1)_n$, $(b2\text{-}b1)_n\text{-}b2$, $b1\text{-}(b2\text{-}b1)_n$, and $(b2\text{-}b1)_n\text{-}b1'$, more preferred are diblock copolymers represented by b2-b1, triblock copolymers represented by the formula b2-b1-b1', and triblock copolymers having the polymer block (b2), the polymer block (b1), and the polymer block (b2) in this order represented by the formula b2-b1-b2 (the polymer block (b2) is bonded to each end of the polymer block (b1)), and still more preferred are triblock copolymers represented by the formula b2-b1-b2.

The acrylic block copolymer (B) has a peak top molecular weight (Mp) in the range of 50,000 to 180,000. In particular, in terms of high transparency and formability of a thermoplastic elastomer composition according to the present invention, the Mp is preferably 55,000 or more, more preferably 60,000 or more, still more preferably 65,000 or more, and preferably 175,000 or less, more preferably 170,000 or less, still more preferably 165,000 or less.

The acrylic block copolymer (B) preferably has a molecular weight distribution (Mw/Mn) in the range of 1.0 to 1.4. In terms of high molding processability of a thermoplastic elastomer composition, the Mw/Mn more preferably ranges from 1.0 to 1.35, still more preferably 1.0 to 1.3, particularly preferably 1.0 to 1.25.

The peak top molecular weight (Mp), the number-average molecular weight (Mn), and the weight-average molecular weight (Mw) of the acrylic block copolymer (B) are values determined by gel permeation chromatography based on polystyrene standards, and the molecular weight distribution (Mw/Mn) is a value calculated from Mw and Mn.

The polymer block (b2) content of the acrylic block copolymer (B) preferably ranges from 10% to 55% by mass. In terms of high transparency and flexibility of a thermoplastic elastomer composition at normal temperature, the polymer block (b2) content more preferably ranges from 10% to 45% by mass, still more preferably 10% to 40% by mass, still more preferably 12% to 37% by mass, particularly preferably 15% to 35% by mass.

The polymer block (b1) content of the acrylic block copolymer (B) in the present invention preferably ranges from 45% to 90% by mass and from the perspective described above more preferably 55% to 90% by mass, still more preferably 60% to 90% by mass, still more preferably 63% to 88% by mass, particularly preferably 65% to 85% by mass.

The melt flow rate of the acrylic block copolymer (B) measured at 190 degrees Celsius under a load of 21.6 N is preferably 1 g/10 min or more, more preferably 1 to 150 g/10 min, still more preferably 2 to 100 g/10 min. The acrylic block copolymer (B) with a melt flow rate in these ranges provides high transparency.

The type A hardness of the acrylic block copolymer (B) defined in ISO 7619-1 preferably ranges from 5 to 95, more preferably 7 to 80, still more preferably 10 to 70. The acrylic block copolymer (B) with type A hardness in these ranges provides high flexibility.

[Method for Producing Acrylic Block Copolymer (B)]

The acrylic block copolymer (B) is produced by any method that can produce a polymer satisfying the above conditions, including a known method. A block copolymer with a narrow molecular weight distribution is typically produced by living polymerization of a constituent monomer. Examples of such a living polymerization method include a living polymerization method using an organic rare-earth metal complex as a polymerization initiator (see JPA 1994-93060), a living anionic polymerization method using an organic alkali metal compound as a polymerization initiator in the presence of a mineral acid salt, such as an alkali or alkaline-earth metal salt (see Japanese Unexamined Patent Application Publication (Translation of PCT Application) No. 1993-507737), a living anionic polymerization method using an organic alkali metal compound as a polymerization initiator in the presence of an organoaluminum compound (see JPA 1999-335432), and an atom transfer radical polymerization method (ATRP) (see Macromolecular Chemistry and Physics, 2000, vol. 201, pp. 1108 to 1114).

Among these production methods, a living anionic polymerization method using an organic alkali metal compound as a polymerization initiator in the presence of an organoaluminum compound in a solvent exemplified by hydrocarbon is preferred because the resulting block copolymer has high transparency, less residual monomers, and less malodor, and because a smaller number of bubbles are formed while the thermoplastic elastomer composition is shaped. It is also preferred because the methacrylate polymer block has a highly syndiotactic molecular structure, and the thermoplastic elastomer composition has high heat resistance. The organoaluminum compound may be an organo-aluminum compound described in JPA 2019-157067, such as isobutyl bis(2,6-di-t-butyl-4-methylphenoxy) aluminum. The polymerization conditions may be those described in JPA 2019-157067.

The acrylic block copolymer (B) can be produced, for example, by repeating the step of forming a desired polymer block (such as the polymer block (b2) or the polymer block (b1)) a desired number of times at an end of a desired living polymer produced by polymerizing a monomer, and then stopping the polymerization reaction. A binary block (diblock) copolymer composed of polymer block (b2)-polymer block (b1), a ternary block (triblock) copolymer composed of polymer block (b2)-polymer block (b1)-polymer block (b2) or polymer block (b2)-polymer block (b1)-polymer block (b1'), or a quaternary block copolymer composed of polymer block (b2)-polymer block (b1)-polymer block (b2)-polymer block (b1) can be produced by the above method.

The acrylic block copolymer (B) content of a thermoplastic elastomer composition according to the present invention ranges from 20 to 180 parts by mass per 100 parts by mass of the hydrogenated block copolymer (A). An acrylic block copolymer (B) content of less than 20 parts by mass results in decreased adhesive strength between a layer formed of a thermoplastic elastomer composition according to the present invention and a layer formed of a material other than the thermoplastic elastomer composition. On the other hand, an acrylic block copolymer (B) content of more than 180 parts by mass results in a thermoplastic elastomer composition according to the present invention with decreased transparency. In terms of high adhesive strength and transparency of the thermoplastic elastomer composition, the acrylic block copolymer (B) content of the thermoplastic elastomer composition preferably ranges from 30 to 150 parts by mass, more preferably 40 to 100 parts by mass, per 100 parts by mass of the hydrogenated block copolymer (A).

The total amount of the acrylic block copolymer (B) and the hydrogenated block copolymer (A) in a thermoplastic elastomer composition according to the present invention is preferably 30% or more by mass, more preferably 40% or more by mass, still more preferably 45% or more by mass, and for stable high adhesiveness preferably 99% or less by mass, more preferably 90% or less by mass, still more preferably 80% or less by mass.

<Aromatic Polymer (C)>

The aromatic polymer (C) is a polymer with at least one aromatic vinyl compound unit (except the hydrogenated block copolymer (A), the acrylic polymer (B), and the softener (D)).

Examples of the aromatic vinyl compound include styrene, alpha-methylstyrene, 2-methylstyrene, 3-methylstyrene, 4-methylstyrene, 4-propylstyrene, 4-t-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenylbutyl) styrene, 1-vinylnaphthalene, 2-vinylnaphthalene, vinylanthracene, N,N-diethyl-4-aminoethylstyrene, vinylpyridine, 4-methoxystyrene, monochlorostyrene, dichlorostyrene, and divinylbenzene. These aromatic vinyl compounds may be used alone or in combination. Among these, styrene, alpha-methylstyrene, and 4-methylstyrene are preferred, and alpha-methylstyrene is more preferred.

The aromatic polymer (C) may have a structural unit derived from a monomer other than the aromatic vinyl compounds. Examples of the monomer include (meth) acrylic acid, (meth)acrylic acid derivatives, (meth)acrylamide, (meth)acrylamide derivatives, (meth)acrylonitrile, isoprene, 1,3-butadiene, ethylene, vinyl acetate, vinyl chloride, vinylidene chloride, N-vinylindole, N-vinylphthalimide, N-vinylpyrrolidone, N-vinylcarbazole, and N-vinylcaprolactam.

The amount of structural unit derived from an aromatic vinyl compound in the aromatic polymer (C) is preferably 60% or more by mass, more preferably 70% or more by mass, still more preferably 90% or more by mass, still more preferably 80% or more by mass, particularly preferably 95% or more by mass.

The aromatic polymer (C) preferably has a weight-average molecular weight (Mw) of 300 or more, more preferably 500 or more, still more preferably 1,000 or more, and preferably 12,000 or less, more preferably 8,000 or less, still more preferably 6,000 or less. Mw in these ranges tends to result in a thermoplastic elastomer composition with higher transparency. The weight-average molecular weight (Mw) of the aromatic polymer (C) is a value determined by gel permeation chromatography based on polystyrene standards.

The aromatic polymer (C) may have any softening point, for example, preferably 5 degrees Celsius or more, more preferably 30 degrees Celsius or more, still more preferably 60 degrees Celsius or more. The aromatic polymer (C) with a softening point in these ranges provides a thermoplastic elastomer composition with higher transparency.

Examples of the aromatic polymer (C) include polystyrene, poly(alpha-methylstyrene), poly(4-methylstyrene), styrene/alpha-methylstyrene copolymers, styrene/4-methylstyrene copolymers, alpha-methylstyrene/4-methylstyrene copolymers, and styrene/alpha-methylstyrene/4-methylstyrene copolymers. These aromatic polymers (C) may be used alone or in combination.

The aromatic polymer (C) may be a commercial product. Examples of the commercial aromatic polymer (C) include aromatic polymers manufactured by Eastman Chemical Company, such as Piccolastic A5 (polystyrene, softening point 5 degrees Celsius, Mw 350), Piccolastic A-75 (polystyrene, softening point 74 degrees Celsius, Mw 1300), Piccotex 75 (alpha-methylstyrene/4-methylstyrene copolymer, softening point 75 degrees Celsius, Mw 1100), Piccotex LC (alpha-methylstyrene/4-methylstyrene copolymer, softening point 91 degrees Celsius, Mw 1350), Kristalex 3070 (styrene/alpha-methylstyrene copolymer, softening point 70 degrees Celsius, Mw 950), Kristalex 3085 (styrene/alpha-methylstyrene copolymer, softening point 85 degrees Celsius, Mw 1150), Kristalex 3100 (styrene/alpha-methylstyrene copolymer, softening point 100 degrees Celsius, Mw 1500), Kristalex 5140 (styrene/alpha-methylstyrene copolymer, softening point 139 degrees Celsius, Mw 4900), Endex 155 (poly(alpha-methylstyrene), softening point 153 degrees Celsius, Mw 6900), and Endex 160 (poly(alpha-methylstyrene), softening point 158 degrees Celsius, Mw 9200); Himer ST-95 (polystyrene, softening point 95 degrees Celsius, Mw 4000, manufactured by Sanyo Chemical Industries, Ltd.), YS Resin SX-100 (polystyrene, softening point 100 degrees Celsius, Mw 2500, manufactured by Yasuhara Chemical Co., Ltd.), FMR-0150 (styrene/aromatic hydrocarbon copolymer, softening point 145 degrees Celsius, Mw 2040, manufactured by Mitsui Chemicals, Inc.), FTR-6100 (styrene/aliphatic hydrocarbon copolymer, softening point 95 degrees Celsius, Mw 1210, manufactured by Mitsui Chemicals, Inc.), FTR-6110 (styrene/aliphatic hydrocarbon copolymer, softening point 110 degrees Celsius, Mw 1570, manufactured by Mitsui Chemicals, Inc.), FTR-6125 (styrene/aliphatic hydrocarbon copolymer, softening point 125 degrees Celsius, Mw 1950, manufactured by Mitsui Chemicals, Inc.), FTR-7100 (styrene/alpha-methylstyrene/ aliphatic hydrocarbon copolymer, softening point 100 degrees Celsius, Mw 1440, manufactured by Mitsui Chemicals, Inc.), FTR-0100 (poly(alpha-methylstyrene), softening point 100 degrees Celsius, Mw 1960, manufactured by Mitsui Chemicals, Inc.), FTR-2120 (styrene/alpha-methylstyrene copolymer, softening point 120 degrees Celsius, Mw 2630, manufactured by Mitsui Chemicals, Inc.), and FTR-2140 (styrene/alpha-methylstyrene copolymer, softening point 137 degrees Celsius, Mw 3230, manufactured by Mitsui Chemicals, Inc.).

The aromatic polymer (C) content of a thermoplastic elastomer composition according to the present invention ranges from 5 to 45 parts by mass per 100 parts by mass of the hydrogenated block copolymer (A). An aromatic polymer (C) content in this range results in a thermoplastic elastomer composition with high transparency and flexibility. In terms of high transparency and flexibility, the aromatic polymer (C) content preferably ranges from 8 to 43 parts by mass, more preferably 10 to 42 parts by mass, still more preferably 15 to 40 parts by mass, per 100 parts by mass of the hydrogenated block copolymer (A).

<Softener (D)>

A thermoplastic elastomer composition according to the present invention further contains the softener (D). The softener provides a thermoplastic elastomer composition with higher transparency and flexibility. Examples of the softener (D) include paraffinic, naphthenic, and aromatic process oils; phthalic acid derivatives, such as dioctyl phthalate and dibutyl phthalate; white oil; mineral oil; liquid co-oligomers of ethylene and alpha-olefin; liquid paraffin; polybutene; low-molecular-weight polyisobutylene; and liquid polydienes, such as liquid polybutadiene, liquid polyisoprene, liquid polyisoprene-butadiene copolymers, liquid styrene-butadiene copolymers, and liquid styrene-isoprene copolymers, and hydrogenated products thereof. Among these, in terms of compatibility with the hydrogenated block copolymer (A), preferred are paraffinic process oils; liquid co-oligomers of ethylene and alpha-olefin; liquid paraffin; and low-molecular-weight polyisobutylene and hydrogenated products thereof, and more preferred are hydrogenated products of paraffinic process oils.

The softener (D) may contain a plant-derived raw material at a high ratio. The plant-derived component content (bioratio) of the softener (D) is preferably 70% or more by mass, more preferably 80% or more by mass, still more preferably 90% or more by mass.

The softener (D) content of a thermoplastic elastomer composition according to the present invention ranges from 70 to 250 parts by mass per 100 parts by mass of the hydrogenated block copolymer (A). A softener (D) content in this range results in a thermoplastic elastomer composition with high transparency and flexibility. In terms of high transparency and flexibility, the softener (D) content preferably ranges from 75 to 200 parts by mass, more preferably 80 to 180 parts by mass, still more preferably 100 to 150 parts by mass, per 100 parts by mass of the hydrogenated block copolymer (A).

(Other Optional Components)

If necessary, a thermoplastic elastomer composition according to the present invention may contain an inorganic filler (E), an antioxidant (F), another thermoplastic polymer, a tackifier resin, a lubricant, a light stabilizer, a processing aid, a colorant, such as a pigment or dye, a flame retardant, an antistatic agent, a flatting agent, silicon oil, an antiblocking agent, an ultraviolet absorber, a release agent, a foaming agent, an antimicrobial agent, a fungicide, and a perfume, without losing the advantages of the present invention.

<Inorganic Filler (E)>

The inorganic filler (E) may be contained to improve physical properties, such as weatherability, of a thermoplastic elastomer composition according to the present invention, to adjust the hardness of the thermoplastic elastomer composition, and to improve the economic efficiency of the thermoplastic elastomer composition as an extender. Examples of the inorganic filler (E) include calcium carbonate, talc, magnesium hydroxide, aluminum hydroxide, mica, clay, natural silicic acid, synthetic silicic acid, titanium oxide, carbon black, barium sulfate, glass balloon, and glass fiber. These inorganic fillers may be used alone or in combination.

The amount of the inorganic filler (E), if present, is preferably in the range in which the flexibility and transparency of the thermoplastic elastomer composition are not impaired, and is preferably 200 parts or less by mass, more preferably 150 parts or less by mass, still more preferably 100 parts or less by mass, particularly preferably 50 parts or less by mass, per 100 parts by mass of the hydrogenated block copolymer (A).

<Antioxidant (F)>

Examples of the antioxidant (F) include hindered phenol, phosphorus, lactone, and hydroxyl antioxidants. Among these, hindered phenol antioxidants are preferred. The amount of the antioxidant (F), if present, is preferably in the range in which the thermoplastic elastomer composition is not colored while melt-kneading, and preferably ranges from 0.1 to 5 parts by mass per 100 parts by mass of the hydrogenated block copolymer (A).

Examples of the other thermoplastic polymer include olefin polymers without a polar group, poly(phenylene ether) resins, and poly(ethylene glycol). Among these, an olefin polymer without a polar group in a thermoplastic elastomer composition according to the present invention further improves the molding processability of the thermoplastic elastomer composition. The olefin polymer without a polar group may be one or two or more of block or random copolymers of polyethylene, polypropylene, polybutene, or propylene and another alpha-olefin, such as ethylene or 1-butene.

The amount of the other thermoplastic polymer, if present, is preferably 100 parts or less by mass, more preferably 50 parts or less by mass, still more preferably 20 parts or less by mass, still more preferably 10 parts or less by mass, per 100 parts by mass of the hydrogenated block copolymer (A).

Examples of the tackifier resin include rosin resins, terpene phenolic resins, terpene resins, aromatic hydrocarbon modified terpene resins, aliphatic petroleum resins, alicyclic petroleum resins, aromatic petroleum resins, coumarone-indene resins, phenolic resins, and xylene resins.

The tackifier resin preferably has a softening point in the range of 85 to 160 degrees Celsius, more preferably 100 to 150 degrees Celsius, still more preferably 105 to 145 degrees Celsius, in terms of molding processability.

The amount of the tackifier resin, if present, is preferably in the range in which the mechanical properties of the thermoplastic elastomer composition are not impaired, and is preferably 100 parts or less by mass, more preferably 70 parts or less by mass, still more preferably 30 parts or less by mass, particularly preferably 10 parts or less by mass, per 100 parts by mass of the hydrogenated block copolymer (A).

A thermoplastic elastomer composition according to the present invention may be produced by any method that can uniformly mix the hydrogenated block copolymer (A), the acrylic block copolymer (B), the aromatic polymer (C), the softener (D), and, if necessary, the inorganic filler (E), the antioxidant (F), and other components, for example, by a method of dissolving these in a solvent and casting and drying the solution or by a melt-kneading method, preferably by a melt-kneading method in terms of high dispersibility of the constituent components. The melt-kneading can be performed, for example, with a melt kneader, such as a single-screw extruder, a twin-screw extruder, a kneader, a batch mixer, a roller, or a Banbury mixer. A thermoplastic elastomer composition according to the present invention can preferably be produced by melt-kneading in the temperature range of 170 to 270 degrees Celsius and at a screw speed in the range of 50 to 500 rpm.

The hardness of a thermoplastic elastomer composition according to the present invention measured by the type A durometer method according to JIS K 6253-2: 2012 (hereinafter also referred to as the "A hardness") is preferably 75 or less, more preferably 70 or less, still more preferably 65 or less, still more preferably 60 or less. When the A hardness is too high, it is difficult to achieve high flexibility, elasticity, and mechanical properties, and it tends to be difficult to suitably use a thermoplastic elastomer composition with high adhesive strength to a synthetic resin, particularly to a resin containing inorganic filler, such as glass fiber, to a ceramic, or to a metal.

A thermoplastic elastomer composition according to the present invention can be processed into a formed product, for example, by a forming method, such as extrusion, injection, blow forming, compression forming, calendering, or vacuum forming.

A thermoplastic elastomer composition according to the present invention can be used, for example, in the form of a sheet, a film, or a laminate including another sheet or film, for packaging of commodities, packaging of industrial materials, a packaging sheet for food, or a film application. A thermoplastic elastomer composition according to the present invention can be widely applied to various formed products, for example, hoses, tubes, and belts; footwear applications, such as sports shoes and fashion sandals; household electrical appliances, such as television sets, audio equipment, vacuum cleaners, refrigerator door seals, remote control switches, and mobile phones; office automation equipment applications; automotive applications, such as automotive interior and exterior parts applications, such as bumper parts, rack and pinion boots, suspension boots, constant velocity joint boots, and body panels; civil engineering and construction applications, such as civil engineering sheets, waterproof sheets, window frame sealants, building sealants, various hoses, and knobs; medical supplies, such as medical syringe gaskets, catheter tubes, and infusion bags; various grips for scissors, screwdrivers, toothbrushes, and ski poles; stationery, such as pen grips; sports goods, such as water glasses and snorkels; various packing applications for sealing, waterproofing, soundproofing, and vibration isolation, and recreational equipment, toys, and industrial articles. These formed products may have any shape, structure, and application. A thermoplastic elastomer composition according to the present invention has high flexibility, transparency, and tensile properties and high adhesive strength even to polar materials and can therefore be used as a layered structure having a layer formed of the thermoplastic elastomer composition according to the present invention and a layer formed of a material other than the thermoplastic elastomer composition.

[Layered Structure]

A laminate according to the present invention has a layer formed of a thermoplastic elastomer composition according to the present invention and a layer formed of a material other than the thermoplastic elastomer composition. A layered structure according to the present invention may be a layered structure formed by bonding two or more of a layer formed of the thermoplastic elastomer composition and a layer formed of a material other than the thermoplastic elastomer composition.

The layered structure may have any shape and may be film-like, sheet-like, or tubular. Among these, a film-like layered structure is preferred.

Examples of the material other than the thermoplastic elastomer composition to be an adherend include synthetic resins, ceramics, metals, and textiles.

Examples of the synthetic resins used for a layered structure according to the present invention include polyurethane resins, polyamide resins, polyester resins, polycarbonate resins, poly(phenylene sulfide) resins, polyacrylate resins, polymethacrylate resins, polyether resins, (meth)acrylonitrile-butadiene-styrene resins, (meth)acrylonitrile-styrene resins, (meth)acrylate-butadiene-styrene resins, (meth)acrylate-styrene resins, methyl (meth)acrylate-butadiene-styrene resins, epoxy resins, phenolic resins, diallyl phthalate resins, polyimide resins, melamine resins, polyacetal resins, polysulfone resins, polyethersulfone resins, polyetherimide resins, poly(phenylene ether) resins, polyarylate resins, poly(ether ether ketone) resins, polystyrene resins, rubber reinforced polystyrene resins, and syndiotactic polystyrene resins. These synthetic resins may be used alone or in combination.

The term "(meth)acrylonitrile", as used herein, refers to "acrylonitrile or methacrylonitrile".

Other preferred examples of the synthetic resins include polyolefin resins, such as polyethylene, polypropylene, polybutene-1, polyhexene-1, poly-3-methyl-butene-1, poly-4-methyl-pentene-1, copolymers of ethylene and one or two or more alpha-olefins having 3 to 20 carbon atoms (for example, propylene, 1-butene, 1-pentene, 1-hexene, 1-heptene, 1-octene, 1-decene, 3-methyl-1-butene, 4-methyl-1-pentene, 6-methyl-1-heptene, isooctene, isooctadiene, and decadiene), ethylene-propylene-diene copolymers (EPDM), ethylene-vinyl acetate copolymers, and ethylene-acrylic acid copolymers.

Without compromising the objects of the present invention, if necessary, the layer formed of the synthetic resin may contain additive agents, for example, a heat stabilizer, a light stabilizer, an ultraviolet absorber, an antioxidant, a lubricant, a colorant, an antistatic agent, a flame retardant, a water repellent, a waterproofing agent, a hydrophilicity imparting agent, an electrical conductivity imparting agent, a thermal conductivity imparting agent, an electromagnetic shielding imparting agent, a light transmittance adjusting agent, a fluorescent agent, a sliding characteristics imparting agent, a transparency imparting agent, an anti-blocking agent, a metal deactivator, and an antimicrobial agent.

The ceramics for use in a layered structure according to the present invention refer to nonmetallic inorganic materials and include metal oxides, metal carbides, and metal nitrides. Examples include glass, cement, alumina, zirconia, zinc oxide ceramics, barium titanate, lead zirconate titanate, silicon carbide, silicon nitride, and ferrite.

Examples of the metals for use in a layered structure according to the present invention include iron, copper, aluminum, magnesium, nickel, chromium, zinc, and alloys thereof. A layer with a surface formed by plating, such as copper plating, nickel plating, chromium plating, tin plating, zinc plating, platinum plating, gold plating, or silver plating, may be used as a metal layer.

The fabric of textiles for use in a layered structure according to the present invention may be of any type, for example, a woven fabric, a knitted fabric, felt, or a nonwoven fabric. A material of the textiles may be a natural fiber or a synthetic fiber or may be composed of a natural fiber and a synthetic fiber. The natural fiber may be, but is not limited to, one or two or more selected from the group consisting of cotton, silk, hemp, and wool.

The synthetic fiber is preferably at least one selected from polyester fiber, acrylic fiber (polyacrylonitrile), polyurethane fiber, polyamide fiber, polyolefin fiber, and vinylon fiber. The polyamide fiber may be nylon 6 or nylon 66. The polyolefin fiber may be polyethylene fiber or polypropylene fiber.

The material other than the thermoplastic elastomer composition is preferably a synthetic resin or a metal in terms of higher adhesive strength, which is an advantage of the present invention.

A layered structure according to the present invention may be produced by any method and is preferably produced by melting, laminating, and forming a thermoplastic elastomer composition according to the present invention and a structure composed of the other material. Examples of the forming method include an injection insert forming method, a overmolding or two-color molding method, an extrusion lamination method, a coextrusion method, a calendering method, a slush forming method, a press forming method, and a melt casting method.

For example, when a layered structure is produced by the injection insert forming method, an adherend (a structure composed of a material other than the thermoplastic elastomer compositions according to the present invention) that has been formed in a predetermined shape and size in advance can be placed in a mold, and a thermoplastic elastomer composition according to the present invention can be injected into the mold to produce the layered structure. When a layered structure is produced by the extrusion lamination method, a thermoplastic elastomer composition according to the present invention in a molten state extruded from a die with a predetermined shape attached to an extruder can be directly extruded on a surface or an edge of an adherend that has been formed in a predetermined shape and size in advance to produce the layered structure. When a layered structure is produced by the coextrusion method, a thermoplastic elastomer composition according to the present invention and a synthetic resin other than the thermoplastic elastomer composition can be simultaneously melted and extruded with two extruders to produce the layered structure. When a layered structure is produced by the calendering method, a thermoplastic elastomer composition according to the present invention that is melted and rolled with a heating roll and is melted through several rolls can be thermally fused with a surface of an adherend that has been formed in a predetermined shape and size in advance to produce the layered structure. When a layered structure is produced by the press forming method, a formed product of a thermoplastic elastomer composition according to the present invention formed in advance by an injection method or an extrusion method can be heated and pressurized with a pressing machine to an adherend that has been formed in a predetermined shape and size in advance to produce the layered structure. The press forming method is particularly suitable when the adherend is a ceramic or a metal.

The forming method including melting, laminating, and forming is preferably the injection insert forming method.

The injection temperature in the injection insert forming method is preferably, but not limited to, 150 degrees Celsius or more, more preferably 200 degrees Celsius or more, still more preferably 250 degrees Celsius or more, in terms of sufficient adhesiveness.

When the adherend is a polar resin or a polyolefin resin, both can be simultaneously melted and coextruded or coinjected to produce a layered structure. Alternatively, one layer can be formed in advance and then melt-coated or solution-coated with a component for another layer to produce a layered structure. A layered structure can also be produced by overmolding, two-color molding or insert forming.

A thermoplastic elastomer composition, a formed product, and a layered structure according to the present invention can be widely applied to various applications. For example, synthetic resins, synthetic resins containing glass fiber, and light metals, such as aluminum and magnesium alloys, are used as housing materials for electronic/electrical equipment, office automation equipment, household electrical appliances, electric power tools, and automotive parts. Layered structures of a thermoplastic elastomer composition according to the present invention bonded to these housing materials can be used. More specifically, a thermoplastic elastomer composition according to the present invention is bonded to housings of large displays, notebook computers, mobile phones, PHSs, PDAs (personal digital assistants, such as electronic notebooks), electronic dictionaries, video cameras, digital still cameras, portable audio instruments, and inverters and is preferably used for shock absorbing materials, coating materials with an anti-slip function, waterproof materials, and design materials.

A thermoplastic elastomer composition according to the present invention is also useful as a formed product or structure bonded to glass in a wide range of applications, such as window moldings and gaskets for automobiles and buildings, glass sealing materials, and anticorrosive materials. A thermoplastic elastomer composition according to the present invention can also be suitably used as a sealant for a joint between glass and an aluminum sash or metal opening in windows of automobiles and buildings or a joint between glass and a metallic frame in solar cell modules. Furthermore, a thermoplastic elastomer composition according to the present invention can be suitably used for information terminal equipment, such as notebook computers, mobile phones, and video cameras, and separators for secondary batteries for use in hybrid vehicles and fuel cell vehicles.

Furthermore, a thermoplastic elastomer composition according to the present invention can be suitably used for various applications, including food packaging materials, such as food packaging sheets and cap liners, commodities, such as toothbrush handles and cosmetic cases, sporting goods, such as ski boots, skis, water glasses, swimming goggles, and skins and core materials of golf balls, toys, stationery, such as pen grips and desk mats, automotive interior parts, such as instrument panels, center panels, center console boxes, door trim, pillars, assist grips, steering wheels, knobs, and air back covers, automotive interior and exterior parts, such as bumper guards and moldings, automotive functional parts, such as rack and pinion boots, suspension boots, and constant velocity joint boots, automotive electrical and electronic parts, such as curling cord wire coating, various belts, hoses, tubes, and silencer gears, civil engineering and construction applications, such as civil engineering sheets, waterproof sheets, window frame sealants, building sealants, various hoses, and knobs, vacuum cleaner bumpers, refrigerator door seals, underwater products, such as underwater camera covers, household electrical appliances, such as remote control switches and office automation equipment, audio-visual equipment applications, such as connector bobbins and various switches, office automation equipment applications, various cover components, various industrial components with a packing for sealing, waterproofing, soundproofing, and vibration isolation, masks, such as dustproof masks, transfer trays for precision components, industrial applications, such as automatic robot components, footwear and clothing applications, such as shoe soles and top lifts, textile applications, play equipment applications, and medical equipment applications.

EXAMPLES

Although the present invention is further described in the following examples, the present invention is not limited to these examples. In the production examples described below, monomers and other compounds were dried, purified, and degassed with nitrogen in the usual manner before use. The monomers and other compounds were transferred and supplied to the reaction system in a nitrogen atmosphere. Various physical properties in the examples and comparative examples were measured or evaluated by the methods described later.

Components used in the examples and comparative examples are described below.
<Hydrogenated Block Copolymer (A)>
Hydrogenated block copolymers (A-1) and (A-2) of production examples 1 and 2 described later
<Acrylic Block Copolymer (B)>
Acrylic block copolymers (B-1) to (B-5) of production examples 3 to 7 described later
<Aromatic Polymer (C)>
Aromatic polymer (C-1): poly(alpha-methylstyrene)/styrene copolymer (trade name: Kristalex 5140 manufactured by Eastman Chemical Company)
Aromatic polymer (C-2): poly(alpha-methylstyrene) polymer (trade name: Endex 155 manufactured by Eastman Chemical Company
<Softener (D)>
Hydrogenated paraffin oil ("Diana Process Oil PW-90" manufactured by Idemitsu Kosan Co., Ltd.

The measurement methods in the production examples are described below in detail.
(1) Measurement of Peak Top Molecular Weight (Mp) and Molecular Weight Distribution (Mw/Mn)

The peak top molecular weight (Mp) and molecular weight distribution (Mw/Mn) of the hydrogenated block copolymer (A) and the acrylic block copolymer (B) were determined by gel permeation chromatography (GPC) as a standard polystyrene equivalent molecular weight, and the peak top molecular weight (Mp) was determined from the peak top position of the molecular weight distribution. The measuring apparatus and conditions are described below.

- Apparatus: GPC apparatus "GPC 8020" manufactured by Tosoh Corporation
- Separation column: "TSKgel GMHXL", "G4000HXL", and "G5000HXL" manufactured by Tosoh Corporation connected in series
- Detector: "RI-8020" manufactured by Tosoh Corporation
- Eluent: tetrahydrofuran
- Eluent Flow Rate: 1.0 ml/min
- Sample concentration: 5 mg/10 ml
- Column temperature: 40 degrees Celsius (2) Method for Measuring Hydrogenation Rate In the following production examples, each of the block copolymer (P) and the hydrogenated block copolymer (A) after hydrogenation was dissolved in a deuterochloroform solvent and was subjected to $^1$H-NMR with "Lambda-500" manufactured by JEOL Ltd. at 50 degrees Celsius. The hydrogenation rate of a carbon-carbon double bond in the polymer block (a2) of the hydrogenated block copolymer (A) was calculated using the following formula from a peak of a proton of the carbon-carbon double bond appearing at 4.5 to 6.0 ppm in the resulting spectrum.

Hydrogenation rate (% by mole)={1−(the number of moles of carbon-carbon double bonds per mole of the hydrogenated block copolymer (A))/(the number of moles of carbon-carbon double bonds contained per mole of the block copolymer (P))}×100

(3) Measurement of Each Polymer Block Content in Block Copolymer

In the following production examples, each polymer block content of the acrylic block copolymer (B) was determined by $^1$H-NMR measurement. The measuring apparatus and conditions for the $^1$H-NMR measurement are described below.

Apparatus: nuclear magnetic resonance spectrometer "JNM-ECX400" manufactured by JEOL Ltd.
Deuterated solvent: deuterated chloroform In a $^1$H-NMR spectrum, signals around 3.6 ppm and 3.7 ppm were assigned to an ester group (—O—CH$_3$) of a methyl methacrylate unit and an ester group (—O—CH$_3$) of a methyl acrylate unit, respectively, and signals around 4.0 ppm were assigned to an ester group (—O—CH$_2$—CH$_2$—CH$_2$—CH$_3$) of a n-butyl acrylate unit or an ester group (—O—CH$_2$—CH(—CH$_2$—CH$_3$)—CH$_2$—CH$_2$—CH$_2$—CH$_3$) of a 2-ethylhexyl acrylate unit. The mole ratio of the structural unit derived from each monomer was determined from the ratio of integral values thereof, and the mole ratio was converted to a mass ratio based on the molecular weight of the structural unit derived from the monomer to determine each polymer block content.

Hydrogenated Block Copolymer (A)

Production Example 1

A pressure vessel purged with nitrogen and dried was charged with 50.0 kg of a solvent cyclohexane and 101 g of an anionic polymerization initiator sec-butyl lithium (10.5% by mass cyclohexane solution) and was heated to 50 degrees Celsius. 1.40 kg of styrene (1) was then added to the mixture and was polymerized for 1 hour. 2.90 kg of butadiene and 3.66 kg of isoprene were then added to the mixture and were polymerized for 2 hours. 1.40 kg of styrene (2) was then added to the mixture and was polymerized for 1 hour. Thus, a reaction liquid containing a triblock copolymer of styrene polymer block-isoprene/butadiene polymer block-styrene polymer block was produced. A hydrogenation catalyst palladium carbon (palladium loading: 5% by mass) was added to this reaction liquid in an amount of 5% by mass of the block copolymer, and the reaction was performed at a hydrogen pressure of 2 MPa and at 150 degrees Celsius for 10 hours. After cooling and pressure release, the palladium carbon was filtered out, and the filtrate was concentrated and dried under vacuum to produce a hydrogenated product of a triblock copolymer of styrene polymer block-isoprene polymer block-styrene polymer block (hereinafter referred to as a hydrogenated block copolymer (A-1)). The hydrogenated block copolymer (A-1) was evaluated as described above. Table 1 shows the results.

Production Example 2

A hydrogenated block copolymer (A-2) was produced in the same manner as in Production Example 1 except for the formulation shown in Table 1 and the addition of 57.0 g of tetrahydrofuran as a Lewis base. The hydrogenated block copolymer (A-2) was evaluated as described above. Table 1 shows the results.

TABLE 1

|  |  | Production example 1 A-1 | Production example 2 A-2 |
|---|---|---|---|
| Amount of used [kg] | Cyclohexane | 50 | 50 |
|  | sec-Butyl lithium | 0.101 | 0.104 |
|  | Tetrahydrofuran | — | 0.0570 |
|  | Styrene(1) | 1.40 | 1.40 |
|  | Styrene(2) | 1.40 | 1.40 |
|  | Butadiene | 2.90 | 6.56 |
|  | Isoprene | 3.66 | — |
| (a1)/(a2) [mass ratio] (*1) |  | 30/70 | 30/70 |
| Block copolymer form (*2) |  | St-Ip/Bd-St | St-Bd-St |
| Peak top molecular weight (Mp) |  | 92,000 | 86,000 |
| Molecular weight distribution (Mw/Mn) |  | 1.10 | 1.05 |
| Hydrogenation rate [% by mole] (*3) |  | 98.2 | 98.0 |

Each notation in Table 1 is as follows:
(*1): (a1)/(a2) denotes the mass ratio of the polymer block (a1) content to the polymer block (a2) content.
(*2): St-(Ip/Bd)-St denotes a triblock copolymer of styrene polymer block- (isoprene/butadiene) copolymer block-styrene polymer block. St-Bd-St denotes a triblock copolymer of styrene polymer block-butadiene polymer block-styrene polymer block.
(*3): The hydrogenation rate indicates the hydrogenation rate of a carbon-carbon double bond in the polymer block (a2).

Acrylic Block Copolymer (B)

Production Example 3

(1) With stirring at room temperature, a pressure vessel purged with nitrogen and dried was charged with 50.0 kg of toluene and 0.0998 kg of 1,2-dimethoxyethane, subsequently 0.820 kg of a toluene solution containing 412 mmol of isobutyl bis(2,6-di-t-butyl-4-methylphenoxy) aluminum, and 0.121 kg of a cyclohexane solution of sec-butyl lithium containing 206 mmol of sec-butyl lithium.

(2) Subsequently, 1.47 kg of methyl methacrylate was added to the mixture with stirring at room temperature and was stirred for another 60 minutes. The reaction liquid was initially colored yellow and became colorless after stirring for 60 minutes.

(3) Subsequently, the internal temperature of the polymerization solution was decreased to −30 degrees Celsius, and 6.33 kg of n-butyl acrylate was added dropwise with stirring over 4 hours and was stirred at −30 degrees Celsius for another 5 minutes after the dropwise addition was completed.

(4) Subsequently, 1.20 kg of methyl methacrylate was added to the mixture and was stirred at room temperature overnight.

(5) After 0.370 kg of methanol was added to stop the polymerization reaction, the reaction liquid was poured into methanol with stirring to form a white precipitate. The white precipitate was collected and dried to produce an acrylic block copolymer (B-1). The peak top molecular weight (Mp) and molecular weight distribution (Mw/Mn) of the acrylic block copolymer (B-1) were determined by the GPC measurement. The total PMMA (a polymer block composed of 100% by mass of a methyl methacrylate unit) content (b2) and the polymer block (b1) content of the acrylic block copolymer (B-1) were measured by the $^1$H-NMR measurement to determine (b2)/(b1). Table 2 shows the results.

<<Production Examples 4 to 7>>

Acrylic block copolymers (B-2) to (B-5) were produced in the same manner as in Production Example 3 except that the amounts of 1,2-dimethoxyethane, isobutyl bis(2,6-di-t-butyl-4-methylphenoxy) aluminum, and sec-butyl lithium added in the step (1), the amount of monomer added in the steps (2) and (4), and the type and amount of monomer added in the step (3) were changed as shown in Table 2. The acrylic block copolymers (B-2) to (B-5) were evaluated as described above. Table 2 shows the results.

TABLE 2

|  |  | Production example 3 B-1 | Production example 4 B-2 | Production example 5 B-3 |
|---|---|---|---|---|
| Amount of used [kg] | Toluene | 50.0 | 50.0 | 50.0 |
|  | 1,2-Dimethoxyethane | 0.0998 | 0.0874 | 0.0444 |
|  | Isobutyl bis (2,6-di-t-butyl-4-methylphenoxy) aluminum | 0.820 | 0.754 | 0.383 |
|  | sec-Butyl lithium | 0.121 | 0.106 | 0.0538 |
|  | MMA (b-2) | 1.47 | 1.08 | 0.610 |
|  | nBA (b-1-1) | 6.33 | 6.77 | 7.50 |
|  | 2EHA (b-1-2) | — | — | — |
|  | MMA (b-2) | 1.20 | 1.08 | 0.848 |
| (b2)/(b1)[mass ratio] (*4) |  | 30/70 | 23/77 | 16/94 |
| (b1-1)/(b1)[% by mass] (*5) |  | 100 | 100 | 100 |
| Block copolymer form (*6) |  | MMA-nBA-MMA | MMA-nBA-MMA | MMA-nBA-MMA |
| Peak top molecular weight (Mp) |  | 66,000 | 81,000 | 152,000 |
| Molecular weight distribution (Mw/Mn) |  | 1.17 | 1.18 | 1.22 |

|  |  | Production example 6 B-4 | Production example 7 B-5 |
|---|---|---|---|
| Amount of used [kg] | Toluene | 50.0 | 50.6 |
|  | 1,2-Dimethoxyethane | 0.0907 | 0.0335 |
|  | Isobutyl bis (2,6-di-t-butyl-4-methylphenoxy) aluminum | 0.746 | 0.298 |
|  | sec-Butyl lithium | 0.110 | 0.0407 |
|  | MMA (b-2) | 0.886 | 0.462 |
|  | nBA (b-1-1) | 3.57 | 8.04 |
|  | 2EHA (b-1-2) | 3.57 | — |
|  | MMA (b-2) | 0.968 | 0.497 |
| (b2)/(b1)[mass ratio] (*4) |  | 20/80 | 11/89 |
| (b1-1)/(b1)[% by mass] (*5) |  | 50 | 100 |
| Block copolymer form (*6) |  | MMA-(nBA/2EHA)-MMA | MMA-nBA-MMA |
| Peak top molecular weight (Mp) |  | 73,000 | 217,000 |
| Molecular weight distribution (Mw/Mn) |  | 1.25 | 1.25 |

Each notation in Table 2 is as follows:
MMA: methyl methacrylate
nBA: n-butyl acrylate
2EHA: 2-ethylhexyl acrylate
(*4): (b2)/(b1) denotes the mass ratio of the polymer block (b2) content to the polymer block (b1) content.
(*5): (b1-1)/(b1) denotes the amount of the structural unit derived from the acrylate (b1-1) with an organic group having 4 to 6 carbon atoms in the polymer block (b1).
(*6): MMA-nBA-MMA denotes a triblock copolymer of methyl methacrylate polymer block-n-butyl acrylate polymer block-methyl methacrylate polymer block. MMA-(nBA/2EHA)-MMA denotes a triblock copolymer of methyl methacrylate polymer block-(n-butyl acrylate/2-ethylhexyl acrylate) copolymer block-methyl methacrylate polymer block.

Examples 1 to 11 and Comparative Examples 1 to 7

<Production of Thermoplastic Elastomer Composition>

A thermoplastic elastomer composition was produced by melt-kneading a composition, which was prepared by pre-mixing the components shown in Tables 3 and 4 at the ratios shown in Tables 3 and 4, with a twin-screw extruder ("ZSK25" manufactured by Coperion) at 200 degrees Celsius and at a screw speed of 200 rpm. Physical properties of the thermoplastic elastomer composition were measured as described below. Tables 3 and 4 show the results.

<Production of Layered Structure>

A layered structure was produced by the injection insert forming method using the following adherend (100 mm in length×45 mm in width×1 mm in thickness) as an insert component. A layered structure was produced by fixing each insert component in a mold, filling the mold with the thermoplastic elastomer composition at a mold temperature of 40 degrees Celsius and at a cylinder temperature of 240 degrees Celsius, and cooling the adherend to a surface temperature of 40 degrees Celsius. The layer of the thermoplastic elastomer composition was visually inspected for separation from the layered structure.

The adherend used to produce the layered structure is described below in detail.

Polycarbonate (PC) sheet: trade name "Iupilon (registered trademark) S-3000", manufactured by Mitsubishi Engineering-Plastics Corporation (1) Hardness (1-1) Production of Sheet of Thermoplastic Elastomer Composition Each thermoplastic elastomer composition of the examples and comparative examples was injected with an injection machine ("SE18DU" manufactured by Sumitomo Heavy Industries, Ltd.) at a cylinder temperature of 200 degrees Celsius and at a mold temperature of 40 degrees Celsius to produce a sheet 50 mm in length, 50 mm in width, and 2 mm in thickness.

(1-2) Measurement of Hardness

The hardness of three sheets of the thermoplastic elastomer composition 6 mm in thickness was measured with a type A durometer indenter in accordance with JIS K 6253-3: 2012.

(2) Measurement of Tensile Fracture Strength and Tensile Fracture Strain

Each thermoplastic elastomer composition of the examples and comparative examples was injected with the injection machine ("SE18DU" manufactured by Sumitomo Heavy Industries, Ltd.) at a cylinder temperature of 200 degrees Celsius and at a mold temperature of 40 degrees Celsius to produce a dumbbell No. 5 test specimen according to JIS K 6251: 2010. The tensile fracture strength and tensile fracture strain of the dumbbell No. 5 test specimen were measured in accordance with JIS K 6251: 2010. Higher tensile fracture strength and tensile fracture strain indicate better tensile properties. The tensile fracture strength is preferably 2.0 MPa or more, more preferably 3.5 MPa or more. The tensile fracture strain is preferably 100% or more, more preferably 150% or more.

(3) Total Light Transmittance and Haze

The total light transmittance and haze of a sheet of the thermoplastic elastomer composition 50 mm in length, 50 mm in width, and 2 mm in thickness was measured in accordance with JIS K 7361-1: 1997.

A total light transmittance of 90.5% or more was rated AA, 90% or more and less than 90.5% was rated BB, and less than 90% was rated CC.

A haze of 8% or less was rated AA, more than 8% and 10% or less was rated BB, and more than 10% was rated CC.

(4) Adhesiveness

A peel strength test of the layer of the thermoplastic elastomer composition in the layered structure thus produced was performed four times in total with "Instron 5566" manufactured by Instron in accordance with JIS K 6854-2: 1999 at a peel angle of 180 degrees and at a crosshead speed of 100 mm/min.

The layered structure after the peel strength test was visually inspected for any fracture mode of cohesive failure and interfacial separation. A fracture mode of cohesive failure was rated AA, and a fracture mode of interfacial separation was rated BB.

TABLE 3

|  |  | Example 1 | Example 2 | Example 3 | Example 4 | Example 5 | Example 6 |
|---|---|---|---|---|---|---|---|
| Hydrogenated block copolymer (A) (parts by mass) | (A-1) | 100 | 100 | 100 | 100 | 100 | 100 |
|  | (A-2) |  |  |  |  |  |  |
| Acrylic block copolymer (B) (parts by mass) | (B-1) | 50 | 50 |  |  |  |  |
|  | (B-2) |  |  | 50 |  |  | 25 |
|  | (B-3) |  |  |  | 50 |  | 25 |
|  | (B-4) |  |  |  |  | 50 |  |
|  | (B-5) |  |  |  |  |  |  |
| Aromatic polymer (C) (parts by mass) | (C-1) | 10 | 20 | 20 | 20 | 20 | 30 |
|  | (C-2) |  |  |  |  |  |  |
| Softener (D) (parts by mass) | (D-1) | 100 | 100 | 100 | 100 | 100 | 100 |
| Hardness (Type A) |  | 35 | 41 | 34 | 31 | 33 | 36 |
| Tensile fracture strength (MPa) |  | 4.7 | 4.9 | 4.6 | 4.4 | 4.5 | 4.7 |
| Tensile fracture strain (%) |  | 680 | 660 | 660 | 670 | 650 | 660 |
| Total light transmittance |  | AA | AA | AA | BB | AA | AA |
| Haze |  | AA | AA | AA | BB | AA | AA |
| PC | Adhesiveness | AA | AA | AA | AA | AA | AA |

|  |  | Example 7 | Example 8 | Example 9 | Example 10 | Example 11 |
|---|---|---|---|---|---|---|
| Hydrogenated block copolymer (A) (parts by mass) | (A-1) | 100 | 100 | 100 | 100 |  |
|  | (A-2) |  |  |  |  | 100 |
| Acrylic block copolymer (B) (parts by mass) | (B-1) |  |  |  | 50 | 50 |
|  | (B-2) |  |  |  |  |  |
|  | (B-3) | 50 | 50 | 50 |  |  |
|  | (B-4) |  |  |  |  |  |
|  | (B-5) |  |  |  |  |  |
| Aromatic polymer (C) (parts by mass) | (C-1) | 30 | 40 | 30 |  | 10 |
|  | (C-2) |  |  |  | 10 |  |
| Softener (D) (parts by mass) | (D-1) | 100 | 100 | 150 | 100 | 100 |
| Hardness (Type A) |  | 34 | 35 | 23 | 34 | 34 |
| Tensile fracture strength (MPa) |  | 4.6 | 4.7 | 4.3 | 4.6 | 4.3 |
| Tensile fracture strain (%) |  | 640 | 620 | 680 | 650 | 620 |
| Total light transmittance |  | AA | AA | AA | AA | AA |
| Haze |  | AA | BB | AA | AA | AA |
| PC | Adhesiveness | AA | AA | AA | AA | AA |

TABLE 4

| | | Comparative example 1 | Comparative example 2 | Comparative example 3 | Comparative example 4 |
|---|---|---|---|---|---|
| Hydrogenated block copolymer (A) (parts by mass) | (A-1) | 100 | 100 | 100 | 100 |
| | (A-2) | | | | |
| Acrylic block copolymer (B) (parts by mass) | (B-1) | 50 | 50 | 200 | 50 |
| | (B-2) | | | | |
| | (B-3) | | | | |
| | (B-4) | | | | |
| | (B-5) | | | | |
| Aromatic polymer (C) (parts by mass) | (C-1) | | | | 50 |
| | (C-2) | | | | |
| Softener (D) (parts by mass) | (D-1) | 50 | 100 | 100 | 100 |
| Hardness (Type A) | | 51 | 31 | 40 | 60 |
| Tensile fracture strength (MPa) | | 4.7 | 4.5 | 3.7 | 5.6 |
| Tensile fracture strain (%) | | 560 | 660 | 480 | 420 |
| Total light transmittance | | CC | CC | CC | CC |
| Haze | | CC | CC | CC | CC |
| PC | Adhesiveness | AA | BB | BB | AA |

| | | Comparative example 5 | Comparative example 6 | Comparative example 7 |
|---|---|---|---|---|
| Hydrogenated block copolymer (A) (parts by mass) | (A-1) | 100 | 100 | 100 |
| | (A-2) | | | |
| Acrylic block copolymer (B) (parts by mass) | (B-1) | 50 | | |
| | (B-2) | | | |
| | (B-3) | | | |
| | (B-4) | | | |
| | (B-5) | | 50 | 50 |
| Aromatic polymer (C) (parts by mass) | (C-1) | 10 | 10 | 20 |
| | (C-2) | | | |
| Softener (D) (parts by mass) | (D-1) | 50 | 50 | 100 |
| Hardness (Type A) | | 55 | 44 | 30 |
| Tensile fracture strength (MPa) | | 5.6 | 4.8 | 4.4 |
| Tensile fracture strain (%) | | 530 | 570 | 630 |
| Total light transmittance | | CC | CC | BB |
| Haze | | CC | CC | CC |
| PC | Adhesiveness | AA | AA | AA |

The results of the examples are summarized in Table 3, and the results of the comparative examples are summarized in Table 4.

Examples 1 to 11 had higher transparency and adhesiveness than Comparative Example 2, which did not contain the aromatic polymer (C).

Comparative Example 4, which had a higher aromatic polymer (C) content than the scope of the present invention, had decreased transparency, had increased hardness, and became hard.

Examples 1 to 5 had higher transparency than Comparative Example 7, in which the acrylic block copolymer (B) had a higher molecular weight than the scope of the present invention.

Comparative Example 3, which had a higher acrylic block copolymer (B) content than the hydrogenated block copolymer (A) content but did not contain the aromatic polymer (C), had low transparency.

Comparative Examples 5 and 6, which had a lower softener (D) content than the scope of the present invention, had low transparency. Comparative Example 1, which had a lower softener (D) content than the scope of the present invention and did not contain the aromatic polymer (C), had low transparency.

INDUSTRIAL APPLICABILITY

A thermoplastic elastomer composition according to the present invention has low hardness, good tensile properties, and high transparency. A layer formed of the thermoplastic elastomer composition has high peel strength in a layered structure according to the present invention. Thus, a thermoplastic elastomer composition and a layered structure according to the present invention are useful.

The invention claimed is:

1. A thermoplastic elastomer composition comprising: 100 parts by mass of a hydrogenated block copolymer (A); 20 to 180 parts by mass of an acrylic block copolymer (B); 5 to 45 parts by mass of an aromatic polymer (C); and 70 to 250 parts by mass of a softener (D),
    wherein the hydrogenated block copolymer (A) is a hydrogenated product of a block copolymer (P) having at least two polymer blocks (a1) with a structural unit derived from an aromatic vinyl compound and at least one polymer block (a2) with a structural unit derived from a conjugated diene, a polymer block (a1) content ranging from 3% to 45% by mass,
    the acrylic block copolymer (B) has at least one polymer block (b1) with a structural unit derived from an acrylate and at least one polymer block (b2) with a structural unit derived from a methacrylate, and
    the acrylic block copolymer (B) has a peak top molecular weight in the range of 50,000 to 180,000.

2. The thermoplastic elastomer composition according to claim 1, wherein the hydrogenated block copolymer (A) has a peak top molecular weight in the range of 20,000 to 500,000.

3. The thermoplastic elastomer composition according to claim 1, wherein the aromatic polymer (C) is a polymer of a monomer including at least one selected from the group consisting of styrene, alpha-methylstyrene, and 4-methylstyrene.

4. The thermoplastic elastomer composition according to claim 1, wherein the acrylic block copolymer (B) has a molecular weight distribution in the range of 1.0 to 1.4.

5. The thermoplastic elastomer composition according to claim 1, wherein the acrylic block copolymer (B) is a triblock copolymer having a polymer block (b2) at each end of the polymer block (b1).

6. The thermoplastic elastomer composition according to claim 1, wherein a polymer block (b2) content of the acrylic block copolymer (B) ranges from 10% to 55% by mass.

7. A formed product comprising the thermoplastic elastomer composition according to claim 1.

8. A layered structure comprising: a layer formed of the thermoplastic elastomer composition according to claim 1; and a layer formed of a material other than the thermoplastic elastomer composition.

9. A method for producing a layered structure, comprising melting, laminating, and forming the thermoplastic elastomer composition according to claim 1 and a structure composed of a material other than the thermoplastic elastomer composition.

* * * * *